(12) United States Patent
Litman

(10) Patent No.: US 9,856,394 B2
(45) Date of Patent: Jan. 2, 2018

(54) DYE-TINTABLE, ABRASION RESISTANT COATING FOR OPHTHALMIC LENSES AND METHOD OF APPLICATION

(71) Applicant: Mark Alan Litman, Edina, MN (US)

(72) Inventor: Mark Alan Litman, Edina, MN (US)

( * ) Notice: Subject to any disclaimer, the term of this patent is extended or adjusted under 35 U.S.C. 154(b) by 254 days.

(21) Appl. No.: 14/662,787

(22) Filed: Mar. 19, 2015

(65) Prior Publication Data

US 2016/0272841 A1    Sep. 22, 2016

(51) Int. Cl.
| | | |
|---|---|---|
| *B05D 3/02* | (2006.01) | |
| *C09D 133/14* | (2006.01) | |
| *C09D 143/04* | (2006.01) | |
| *C08J 7/04* | (2006.01) | |
| *G02B 1/00* | (2006.01) | |
| *C08K 3/36* | (2006.01) | |
| *C08K 5/13* | (2006.01) | |

(52) U.S. Cl.
CPC .............. *C09D 133/14* (2013.01); *C08J 7/04* (2013.01); *C09D 143/04* (2013.01); *G02B 1/00* (2013.01); *C08K 3/36* (2013.01); *C08K 5/13* (2013.01)

(58) Field of Classification Search
CPC ...... C09D 133/14; C09D 143/04; B05D 5/00; C08K 5/13; C08K 3/36; C08J 7/04; G02B 1/00
See application file for complete search history.

(56) References Cited

U.S. PATENT DOCUMENTS

| | | |
|---|---|---|
| 3,715,293 A | 2/1973 | Sandner et al. |
| 3,801,329 A | 4/1974 | Sandner et al. |
| 3,961,977 A | 6/1976 | Koda et al. |
| 4,000,115 A | 12/1976 | Jacobs |
| 4,058,401 A | 11/1977 | Crivello |
| 4,069,055 A | 1/1978 | Crivello |
| 4,101,513 A | 7/1978 | Fox et al. |
| 4,161,478 A | 7/1979 | Crivello |
| 4,167,537 A | 9/1979 | Taniyama et al. |
| 4,196,014 A | 4/1980 | Taniyama et al. |
| 4,241,116 A | 12/1980 | Taniyama et al. |
| 4,405,579 A | 9/1983 | Sartori |
| 5,614,321 A | 3/1997 | Medford et al. |
| 6,100,313 A | 8/2000 | Treadway |
| 6,821,657 B1 | 11/2004 | Takahashi et al. |
| 7,732,006 B2 | 6/2010 | de Rojas |
| 8,033,663 B2 | 10/2011 | Valeri |
| 8,399,535 B2 | 3/2013 | Pletcher |
| 2002/0193479 A1 | 12/2002 | Treadway |

*Primary Examiner* — Robert S Walters, Jr.
(74) *Attorney, Agent, or Firm* — Mark A. Litman & Associates, P.A.

(57) ABSTRACT

A coating photoreactive composition comprising a hydrolyzed epoxy-silane and other active ingredients is able to provide an organic dye-tintable abrasion resistant coating without the use of traditional dye-tinting enhancing agents such as polymerizable ethers or polymerizable diethers. The compositions exhibit consistently higher abrasion resistance without significant impact on tintability.

23 Claims, No Drawings

DYE-TINTABLE, ABRASION RESISTANT COATING FOR OPHTHALMIC LENSES AND METHOD OF APPLICATION

BACKGROUND OF THE INVENTION

1. Field of the Invention

The present invention pertains to compositions that are able to provide an abrasion-resistant, dye-tintable coating on a thermoplastic or thermoset polymeric substrate, such as an ophthalmic lens.

2. Background of the Art

It is known that transparent plastic materials such as polycarbonate ophthalmic lenses or screen face plates are subject to becoming dull and hazy due to scratching and abrasion during use.

Attempts have been made to overcome this problem. The technical solutions proposed in the past, which involved applying a UV-curable coating, generally used an organic or aqueous solvent-borne composition which was usually substrate-dependent. That is, the coating compositions were formulated for one specific ophthalmic lens material such as CR-39 (an allyl diglycol carbonate) or thermoplastics such as polycarbonate. The few compositions found in the literature that were solvent-free or substantially organic solvent-free were substrate-dependent. They also usually contained a partially hydrolyzed or fully hydrolyzed silane used both for adhesion and for abrasion resistance.

Moreover, coatings for ophthalmic lenses should also be capable of being tinted by incorporating a dye therein. However, abrasion and scratch resistance, on the one hand, and tintability, on the other hand, are often regarded as hardly parallel properties. Among the solutions proposed to reconcile these properties, U.S. Pat. No. 5,614,321 suggests a curable coating composition comprising colloidal silica, together with a (meth)acrylate compound capable of reacting with said silica, a monomer (preferably an alkoxysilane) bearing (meth)acryloxy groups, a free radical initiator and an organic tintability additive.

US 2002/0193479 teaches a composition comprising both a hydrolyzed and a non-hydrolyzed epoxy-functional alkoxy silane, together with a curing agent and an acrylic monomer preferably bearing not more than two acrylic functions.

Similarly U.S. Pat. No. 6,100,313 (Treadway) discloses a composition comprising an epoxy-functional alkoxysilane, a glycidyl ether, a cationic photoinitiator, an acrylic monomer and a free-radical photoinitiator. It is purported to be solvent-free, but an analysis of the carrier materials and solvents in photoinitiators added indicate a significantly high level or organic solvents.

U.S. Pat. No. 8,033,663 (Valeri) discloses a curable coating composition includes: a) at least one monomer chosen from polyol poly(meth)acrylate monomers having from 3 to 6 (meth)acrylate functions, b) at least one monomer chosen from polyol polyglycidyl ethers having at least three epoxy functions, c) at least one difunctional monomer, d) at least one free-radical photoinitiator, and e) at least one cationic photo-initiator, wherein the molar ratio of acrylate equivalents to epoxy equivalents in the composition ranges from 3:1 to 4:1, and wherein the composition is free of silica and of monomers bearing a silane function. The patent discloses a method for coating a substrate, such as an ophthalmic lens, with this composition, and the coating substrate thus obtained. It is asserted that the coating composition is more stable than the alkoxysilane compositions. However, acryolyl curable compositions are also moisture-sensitive and can produce less abrasive compositions if moisture is introduced into the reaction mixture, even from the air.

It is difficult to find rapidly curing compositions that are relatively stable in a pot during coating operations, provide good abrasion resistance, and then remain dye-tintable, e.g., exhibiting less than 15% transmission to white light after immersion for 15-20 minutes at 90-100° C. in an approximately 5% by weight aqueous solution of a black azo dye such as azo dye Sudan black:

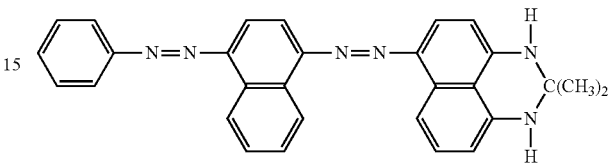

or an anthroquinone dye such as Alizarin blue-black (further identified as CAS Number 1324-21-6 Molecular Formula $C_{26}H_{16}N_2O_9S_2Na_2$, Molecular Weight 610.5, Color Index 63615, EC Number 215-366-9).

BFI Black, manufactured by Brainpower, Inc. of Miami, Fla. has become a standard black tint dye in the ophthalmic industry and would be preferably used for the tint test.

To perform a tinted coating, the surface of the substrate coated with the cured resin matrix of the invention is contacted by a suitable colored dye, in many instances, any commercially viable method of applying the dye may be utilized. The leading manufacturer of suitable dyes is Brainpower, Inc. (BPI) and the usual procedure in tinting follows BPI instructions. In a typical tinting operation the surface of a substrate coated with a cured coating of the present invention is immersed in a heated aqueous dye bath (typically between 90-100° C., usually between 92-98° C.) containing a suitable colored dye, e.g., BPI Sun Black, a molecular catalytic dye sold by BPI of Miami, Fla. The dye solution may be prepared by diluting one part of BPI dye concentration to ten parts water, and then heating the resulting solution to a temperature in the range of about 190° to 212° F. while constantly stirring the solution. The coated surface of the substrate is preferably cleaned by wiping with a compatible solvent prior to immersion in the dye bath at about 90-100° C. for a period of time sufficient to absorb or transmit the desired amount of dye (typically 15-20 minutes), then washed with tap water to remove the excess dye and blown dry with nitrogen. The intensity of the tint can be adjusted by varying the concentration of any organic tintability additive in the coating composition, the thickness of the coating, the time of immersion, or the thickness of the coating. The degree of tint obtained can be determined by using a calorimeter, such as a Gardner XL-835 colorimeter, which measures the percent of light transmittance.

Tintability Test

The percent light transmittance of the samples was determined using a Gardner Haze Meter Model 835 colorimeter with a wavelength range of 600 nanometers. Lexan® (polycarbonate from General Electric Company, Schenectady, N.Y. or any commercial CR-39 polycarbonate), was used as a reference sample and substrate. The percent light transmittance of the uncoated polycarbonate is about 86.9%. The coating compositions were applied to the polycarbonate or other substrate and the percent light transmittance was determined as a direct reading from the meter. For tinted samples, the coated sample was immersed in the dye bath rinsed in cold tap water and blown dry with nitrogen. The formulations of the comparative examples were coated on panels, cured and the coated panels immersed in a 9% tint bath (BPI Black) maintained at 90-100° C. for 15 minutes. The process may also be used with some photochromic dyes including spiro-naphthoxazines, naphthopyrans, anthraquinones, phthalocyanines, spiro-oxazines, chromenes, pyrans, fulgicides and mixtures thereof. Reversacol™ photochromic dyes are available from James Robinson Ltd. (UK) and several of these dyes are listed in the examples below. Permanent dyes can be any permanent dye. Preferred permanent dyes are those that are soluble in the curable material. Permanent dyes include BPI dyes from Brain Power, Inc. (USA) such as BPI Gray and BPI Black. Sigma Aldrich offers a line of permanent dyes such as Solvent Blue, Solvent Black, Solvent Yellow, Solvent Red and Solvent Orange dyes. Preferred dyes include Solvent Black 3, Solvent Black 5, Solvent Black 7, Solvent Blue 43, Solvent Blue 35, Solvent Blue 59, Solvent Blue 14, Solvent Blue 37, Solvent Green 3 and Solvent Red 24. A particularly preferred dye is Solvent Blue 35.

When adding the dye to the curable material (to mask the slight yellow color that some polymers exhibit), a purple or blue dye may be added to the curable material in amounts to mask the yellowness but also in amounts that do not turn the polymer a noticeable blue. A neutral color is desired. In the case of dyes (such as black tinting dyes or Solvent Blue 35 dye) a suitable amount of dye in the curable material is from about 0.0007 wt % to about 0.0020 wt % and preferably from about 0.0010 wt % to about 0.0015 wt % of the total coating. A particularly preferred amount of dye in the curable material is about 0.0008-0.0015%, such as 0.0012 wt %. When adding the dye for tinting for use as sunglasses then the dyes are also added in amounts that aesthetically or cosmetically desirable. Typical classes of dyes include:

| Chemical class | C.I. Constitution numbers |
|---|---|
| Monoazo | 1000-19999 |
| Azine | 50000-50999 |
| Disazo | 20000-29999 |
| Oxazine | 51000-51999 |
| Triazo | 30000-34999 |
| Thiazine | 52000-52999 |
| Polyazo | 35000-36999 |
| Sulphur | 53000-54999 |

It is believed that within these classes, Disazo, and Triazo dyes are preferred. Other dyes that have been considered are those typically used as dye classes for fibers.

| Dye class | Fiber type | Fixation degree, | % Loss in effluent |
|---|---|---|---|
| Acid | Polyamide | 80-95 | 5-20 |
| Basic | Acrylic | 95-100 | 0-5 |
| Direct | Cellulose | 0-95 | 5-30 |
| Disperse | Polyester | 90-100 | 0-10 |
| Metal complex | Wool | 0-98 | 2-10 |
| Reactive | Cellulose | 50-90 | 10-50 |
| Sulphur | Cellulose | 60-90 | 10-40 |
| Dye-stuff | Cellulose | 80-95 | 5-20 |

SUMMARY OF THE INVENTION

A coating photoreactive composition comprising a hydrolyzed epoxysilane and other active ingredients is able to provide an organic dye-tintable abrasion resistant coating without the use of traditional dye-tinting enhancing agents such as (e.g., open-chain) polymerizable ethers or polymerizable diethers. The compositions exhibit consistently higher abrasion resistance without significant impact on tintability.

A hydrolyzed epoxy-silane composition, silica (or equivalent inorganic oxide particles), dialkyl acrylate, tetrahydrofuryl acrylate, a combination of cationic and anionic initiators, urethane acrylate, a low level or optional silicone acrylate, hindered alkyl-bis-phenol stabilizer or a hindered amine stabilizer.

DETAILED DESCRIPTION OF THE INVENTION

The compositions of the present technology accomplish the task of providing good tintability after curing and abrasion resistance with compositions that comprise:

A hydrolyzed epoxy-silane composition, silica (or equivalent inorganic oxide particles), dialkyl acrylate, tetrahydrofuryl acrylate, a combination of cationic and anionic initiators, urethane acrylate, a low level or optional silicone acrylate, a stabilizer for reducing photodegradation of the cured composition (e.g., hindered alkyl-bis-phenol stabilizer).

A coating composition for application to polymeric surfaces to provide cured organic dye-tintable abrasion resistant coatings, the composition may include, for example, in weight percent portions:

| | |
|---|---|
| at least 30% of silane group hydrolyzed epoxy-silane | 25-85% |
| inorganic oxide particles | 6-20% |
| dialkyl (C-3 to C-5 alkyl) acrylate | 10-30% |
| tetrahydrofuryl acrylate | 5-16% |
| cationic photoinitator | 1.0-5% |
| anionic initiators | 2.5-9% |
| urethane acrylate | 3-15% |
| silicone acrylate | 0-5% |
| hindered alkyl-bis-phenol stabilizer or hindered amine stabilizer | 0.5-5%. |

The compositions generally comprise ingredients that may include, by total weight of the coating composition:

| GENESIS COMPONENT | Percent by Weight (excluding solvents) |
|---|---|
| hydrolyzed epoxy-silane composition (30-80% hydrolyzed) | 25-85% |
| inorganic oxide particles (e.g., silica, titania, etc.) | 6-20% |
| dialkyl (C-3 to C-5 alkyl) acrylate | 10-30% |
| tetrahydrofuryl acrylate | 5-16% |
| cationic photoinitator | 1.0-5% |
| anionic photoinitator or thermal initiators | 2.5-9% |
| urethane acrylate | 3-15% |
| a low level or optional silicone acrylate | 0-5% |
| hindered alkyl-bis-phenol stabilizer or hindered amine stabilizer | 0.5-5% |

Many epoxy-functional alkoxysilanes are suitable, but not limited to, compounds such as hydrolysis precursors, including (where a- is alpha, b- is beta, g- is gamma, and d- is delta) γ-glycidoxymethyl-trimethoxysilane, glycidoxymethyltriethoxysilane, glycidoxymethyl-tripropoxysilane, glycidoxymethyl-tributoxysilane, b-glycidoxyethyltrimethoxysilane, b-glycidoxyethyltriethoxysilane, b-glycidoxyethyl-tripropoxysilane, b-glycidoxyethyl-tributoxysilane, b-glycidoxyethyltrimethoxysilane, a-glycidoxyethyl-triethoxysilane, a-glycidoxyethyl-tripropoxysilane, a-glycidoxyethyltributoxysilane, g-glycidoxypropyl-trimethoxysilane, g-glycidoxypropyl-triethoxysilane, g-glycidoxypropyl-tripropoxysilane, g-glycidoxypropyl-tributoxysilane, b-glycidoxypropyl-trimethoxysilane, b-glycidoxypropyl-triethoxysilane, b-glycidoxypropyl-tripropoxysilane, b-glycidoxypropyltributoxysilane, a-glycidoxypropyl-trimethoxysilane, a-glycidoxypropyl-triethoxysilane, a-glycidoxypropyl-tripropoxysilane, a-glycidoxypropyltributoxysilane, g-glycidoxybutyl-trimethoxysilane, d-glycidoxybutyl-triethoxysilane, d-glycidoxybutyl-tripropoxysilane, d-glycidoxybutyl-tributoxysilane, d-glycidoxybutyl-trimethoxysilane, g-glycidoxybutyl-triethoxysilane, g-glycidoxybutyl-tripropoxysilane, g-propoxybutyl-tributoxysilane, d-glycidoxybutyl-trimethoxysilane, d-glycidoxybutyl-triethoxysilane, d-glycidoxybutyl-tripropoxysilane, a-glycidoxybutyl-trimethoxysilane, a-glycidoxybutyl-triethoxysilane, a-glycidoxybutyl-tripropoxysilane, a-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-triethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy)butyl-triethoxysilane, (3,4-epoxycyclohexyl)-butyl-tripropoxysilane, and (3,4-epoxycyclohexyl)butyl-tributoxysilane. The attachment of these groups without a-, b-, d- or g- indicated may be any one of those positions.

The composition is most conveniently formed by first hydrolyzing the epoxy-silane, such as γ-glycidoxy-propyl-trimethoxysilane with water and then extracting the resultant alcohol (e.g., methanol, ethanol, etc.) derived from the removed alkoxy group. This is a well understood process in the chemical arts. (e.g., see U.S. Pat. Nos. 3,961,977; 4,167,537; 4,241,116; 4,196,014; 6,100,313 (Treadway); U.S. Pat. No. 6,821,657 (Takahashi); and U.S. Pat. No. 7,732,006 (de Rojas)). The compositions of the present technology may be formulated and used commercially with less than 15% by total weight of non-reactive (in the epoxy, silane or acrylic reactions) solvents such as propylene carbonate or ethylene carbonate, tetrahydrofuran, polyethylene glycol, alcohols and the like. It is preferred that such organic solvents, which may be present and carried into the formulations with the initiators, which are often provided in solution form with solvents, are present as less than 10% by weight of the total coating composition. It is more preferred that such organic solvents are present as less than 5% of the total weight, less than 4% of the total weight of the coating composition, or at a weight level provided only by amounts of solvent carried by initiator compositions (which although used in relatively small absolute amounts, often contain as much as 50% by weight of solvent as carrier).

Useful cationic initiators for the purposes of this invention include the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts, e.g., diphenyliodonium chloride. The aromatic onium salts and their use as cationic initiators in the polymerization of epoxy compounds are described in detail in U.S. Pat. No. 4,058,401, "Photocurable Compositions Containing Group VIA Aromatic Onium Salts," by J. V. Crivello issued Nov. 15, 1977; U.S. Pat. No. 4,069,055, "Photocurable Epoxy Compositions Containing Group VA Onium Salts," by J. V. Crivello issued Jan. 17, 1978; U.S. Pat. No. 4,101,513, "Catalyst For Condensation Of Hydrolyzable Silanes And Storage Stable Compositions Thereof," by F. J. Fox et al. issued Jul. 18, 1978; and U.S. Pat. No. 4,161,478, "Photoinitiators," by J. V. Crivello issued Jul. 17, 1979, the disclosures of which are incorporated herein by reference. Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, "Photopolymerization Of Epoxides," by Sanford S. Jacobs issued Dec. 28, 1976, the disclosure of which is incorporated herein by reference. Preferred cationic initiators for use in the compositions of this invention are the salts of Group VIa elements and especially the sulfonium salts. Particular cationic catalysts include diphenyliodonium salts of tetrafluoroborate, hexafluorophosphate, hexafluoroarsenate, and hexafluoroantimonate; and triphenylsulfonium salts of tetrafluoroborate, hexafluorophosphate, hexafluoroarsenate, and hexafluoroantimonate.

Although photoactivated free-radical initiators are preferred, thermally activated free radical initiators may also be used. Useful photoinitiators for this purpose are the haloalkylated aromatic ketones, chloromethylbenzophenones, certain benzoin ethers, certain acetophenone derivatives such as diethoxyacetophenone and 2-hydroxy-2-methyl-1-phenylpropan-1-one. A preferred class of free-radical photoinitiators is the benzil ketals, which produce rapid cures. A preferred photoinitiator is α,α-dimethoxy-α-phenyl acetophenone (Iragacure™ 651, Ciba-Geigy, disclosed in U.S. Pat. Nos. 3,715,293 and 3,801,329). The most preferred photoinitiator, in accordance with this invention, is 2-hydroxy-2-methyl-1-phenylpropane-1-one (Darocure™ 1173, Ciba-Geigy Corporation). Specific examples of photoinitiators include ethyl benzoin ether, isopropyl benzoin ether, dimethoxyphenyl acetophenone, diethoxy acetophenone, and benzophenone. The coatings of the present invention combine one or more organofunctional trialkoxysilane monomers, deionized or distilled water to effect hydrolysis with or without the aid of an acid or base catalyst. The hydrolysis of the trialkoxysilane monomer is the first step in preparing coatings of the present invention. This is optionally but preferably done in an open vessel over a period of 4 to 24 hours, depending on the rate of hydrolysis of the specific siloxane, how much water is added and if a catalyst is used. By hydrolyzing in an open vessel, a substantial volume of alcohol is evaporated rendering the hydrolyzed solution essentially free of any volatile constituents. Optionally, a nitrogen sparge or a partial vacuum or both may be used to facilitate the removal of the alcohol that is liberated as a result of hydrolysis. An organic acid or a mineral acid or a combination of one or more of each may be used to catalyze the hydrolysis. Alternatively, an organic base or a mineral base or a combination of one or more of each may be used to catalyze the hydrolysis. The hydrolyzed solution is then stored at room temperature or below in a closed container until needed or immediately used to prepare the coating solution. Stability is a critical factor in developing this and similar coatings. A coating with a 3:1 molar ratio of water to trialkoxysilane tends to increase in viscosity as the alkoxy groups hydrolyze to form silanols, which then condense with the evolution of water resulting in polymerization thereby causing the viscosity to increase until it is too high for proper coating application characteristics. Customers, such as some optical laboratories, with high rates of coating consumption typically consume the fresh coating within one week such that the viscosity increase is not critical but many smaller optical laboratories do not rapidly consume coating and may need up to six months to consume a bottle of coating solution during which time absorption of water from the air, evaporative losses of alcohol, and exposure to ultraviolet light from overhead fluorescent lights, or some combination of these may contribute to a substantial increase in viscosity over weeks and months unless the coating is well formulated to prevent this increase in viscosity under such conditions. Through hundreds of tests, it has been determined that by reducing the molar ratio of water to trialkoxysilane to limit the extent of hydrolysis, the coating solution is much more stable. Coatings of the present invention with a water to trialkoxysilane molar ratio of 1.5:1 increased less than 5 cps in viscosity, typically 1 to 3 cps, after aging for several weeks at room temperature. Whereas a 1.5:1 molar ratio of water to trialkoxysilane will tend to be more stable than a similar coating having a 3:1 molar ration of water to trialkoxysilane, the latter will have better mar resistance than the former.

The hydrolysis is often measured in terms of the number of silane groups reacted together to prepolymerize portions of the epoxysilane compounds. It is desired that at least 25 number percent of all hydroxyl groups on the silane, preferably at least 30-35 number percent of silane group, more preferably at least 50 number percent of the silane groups, up to any percentage that would allow the final composition to be coated and completely cured.

The hydrolyzed epoxy-silane composition used was formed as (~50% hydrolyzed glycidoxypropyltrimethoxy silane) as 80% by weight of a reaction mixture of deionized water as 20% by weight of the reaction mixture. Detailed methods of forming these hydrolyzed alkoxysilane and epoxysilane materials are well known in the art and further described herein.

This combination is used to form a hydrolyzed silane solution referred to as GLYMO. After initial hydrolysis is allowed to proceed to a desired degree the alcohol (e.g., methanol, ethanol, etc.) byproduct (50% of the solution) is extracted to leave the hydrolyzed silane.

In the preferred composition of the present technology, to the hydrolyzed silane is added a composition consisting of proportionally identified weight amounts of:

| | | | |
|---|---|---|---|
| 1) | Silica | 12-18 | (17~26% by weight) |
| 2) | Sartomer ® 213 dibutyl acrylate | 20-30 | (~27-40% by weight) |
| 3) | Sartomer ® 285 tetrahydrofuryl acrylate | 8-12 | (~11-17% by weight) |
| 4) | CPI 6076 solvent based (50%) Initiator | 5-10 | (7~15% by weight) |
| 5) | IRGACURE ® 754 Initiator | 1.5-3.5 | 2-5% by weight) |
| 6) | CN980 urethane acrylate | 5-10 | (7~15% by weight) |
| 7) | EB1360 silicone acrylate | 0.2-0.6 | (~0.06-0.9% by weight) |
| 8) | Lowinox ™ 44b25 hindered alkyl-bis-phenol stabilizer | 0.2-3.6 | (~0.06-5% by weight) |

Comparative Examples

| Company and Product Name | Viscosity Centipoise | Bayer Abrasion after Heating | Taber Abrasion Test (higher better) | Tint Adhesion 1 to 10 on CR-39 |
|---|---|---|---|---|
| ULTRA Optics UVNV | 27-34 cps | 1.701 | 15-16% haze* | 6 |
| ULTRA AST 1 | 18-24 cps | 3.01 | 1.01 | 8.1 |
| ULTRA UV87 | 24-30 cps | 1.85 | 2.5 | 8.2 |
| Arrotek INTL H Coating | 28-32 cps | 1.56 | 1.85 | 7.2 |
| Coburn UVMAX | 35-40 cps | 1.82 | 2.1 | 8.1 |
| Coburn UVAR | 28-32 cps | 1.97 | 2.3 | 8.2 |
| Genesis 1T | 25-30 cps | 2.38 | 2.39 | 8.5 |
| Genesis 2NT | 27-32 cps | 2.46 | 2.78 | 8.7 |

*This haze level was so high due to abrasion that measurement of Taber Abrasion results were not warranted.

The Genesis coatings of the present technology also exhibited a scholastic value of abrasion resistance adhesion of 9.0, which was equal to or higher than every other coating.

NOTES; 1) ALL TESTING WAS DONE IN HOUSE; 2) ALL TESTING WAS DONE WITH A COATING THICKNESS OF 4.5 MICRONS; 3) ALL TESTING WAS DONE WITH SURFACED CR-39 LENSES (SURFACED POLYCARBONATE LENSES SURFACED WITH TRIVEX AND HIGH INDEX LENSES; 4) ALL TINTING WAS DONE WITH BPI BLACK AT 205° F.; 5) ALL COATINGS WERE APPLIED IN HOUSE USING THE EZCOAT® UV SYSTEM; 6) ALL POST CURING WAS DONE IN A CONVECTION OVEN AT 85° C.

It is to be further noted that this unique combination of ingredients provides a highly abrasion resistant final coating that is easily tintable to commercially required levels without the need for specific components (referred to in the art as tint enhancers or tintability agents) that reduce the abrasion resistance of the final composition. Specifically, the compositions and methods of the present technology do not require and may be made in the substantial absence (less than 2% by total weight of the composition, less than 1% by total weight of the composition, less than 0.5% by total weight of the composition) and in the complete absence 0% or less than a measurable 0.01% by total weight of the composition of any one of or combination of glycidyl ethers, allyl ethers and vinyl ethers. These results for abrasion resistance are clearly evidenced by the data in the above table. In every single testing procedure but one (the ULTRA AST 1 composition with Bayer Abrasion after Heating) the Genesis compositions of the present technology (all within the scope of compositions described under the above tabulation showing the range of Genesis Components consistently displayed improved abrasion resistance. Even where the single test against a single composition showed less abrasion resistance, both Genesis compositions consistently showed significantly improved abrasion resistance under other standard testing procedures. This is a remarkable result in view of the fact that these compositions based on epoxysilanes have been known and marketed for over thirty years, and the compositions of the present invention exceed the prior art results so consistently and significantly, yet retain tintability, without sacrifice of abrasion resistance, One main category of light stabilizers consists of what are known as hindered amine light stabilizers (abbreviated as HALS). They are derivatives of 2,2,6,6-tetramethyl piperidine and are extremely efficient stabilizers against light-induced degradation of most polymers.

HALS do not absorb UV radiation, but act to inhibit degradation of the polymer. They slow down the photochemically initiated degradation reactions, to some extent in a similar way to antioxidants. A hindered amine stabilizer such as, for example, 2,2,6,6,-tetramethylpiperidine, can be added to the UHMWPE powder along with the tocopherol phosphite, prior to consolidation and under moisture controlled conditions to prevent premature hydrolysis. The hindered amine stabilizer and other components can be dissolved in a suitable dry state and then into an organic solvent (preferably only in carrier amounts of less than 5% total weight of the composition) to promote uniform distribution. The solvent can then be removed prior to or after blending of the composition with final additional components to obtain a substantially uniform distribution of the individual ingredients. The blended solution is then bottled in a moisture free environment. The bottling can be conducted in a low oxygen and low moisture environment to prevent premature oxidation of materials and to prevent premature hydrolysis of the reactive ingredients. The composition is then coated and crosslinked by ionizing radiation such as gamma, ultraviolet or electron beam radiation, which can also be performed using low moisture conditions. After crosslinking, the coated article can be subjected to humid conditions or water to promote at least some further hydrolysis. See also U.S. Pat. Nos. 8,399,535 and 4,405,579. All references cited herein are incorporated by reference in their entirety.

What is claimed:

1. A coating composition for application to polymeric surfaces to provide cured organic dye-tintable abrasion resistant coatings, the composition comprising in weight percent portions:

| | |
|---|---|
| An epoxy-silane with at least 30% of silane groups hydrolyzed | >25% |
| inorganic oxide particles | 6-20% |
| dialkyl (C-3 to C-5 alkyl) acrylate | 10-30% |
| tetrahydrofuryl acrylate | 5-16% |
| cationic photoinitiator | 1.0-5% |
| anionic initiator | 2.5-9% |
| urethane acrylate | 3-15% |
| silicone acrylate | 0-5% |
| hindered alkyl-bis-phenol stabilizer or hindered amine stabilizer. | 0.5-5% |

2. The coating composition of claim 1 wherein the epoxy-silane comprises an epoxy-silane with 30-80% number total of silane groups hydrolyzed.

3. The coating composition of claim 2 wherein the hydrolyzed epoxy-silane is derived from γ-glycidoxy-propyl-trimethoxysilane.

4. The coating composition of claim 3 wherein the inorganic oxide particles comprise silica.

5. The coating composition of claim 4 wherein the silicone acrylate is present at from 0.5 to 5% by weight of the total coating composition.

6. The coating composition of claim 4 wherein the anionic initiator is an anionic photoinitiator.

7. A method for providing an abrasion-resistant organic dye-tintable coating to a polymeric surface comprising applying the coating composition of claim 6 to a polymeric surface to form a fluid coating and irradiating the fluid coating to cause activation of the photoinitiator and curing of the fluid coating into an abrasion-resistant organic dye-tintable coating.

8. The coating composition of claim 3 wherein the silicone acrylate is present at from 0.5 to 5% by weight of the total coating composition.

9. The coating composition of claim 8 wherein the anionic initiator is an anionic photoinitiator.

10. The coating composition of claim 3 wherein the anionic initiator is an anionic photoinitiator.

11. A method for providing an abrasion-resistant organic dye-tintable coating to a polymeric surface comprising applying the coating composition of claim 3 to a polymeric surface to form a fluid coating and irradiating the fluid coating to cause activation of the photoinitiator and curing of the fluid coating into an abrasion-resistant organic dye-tintable coating.

12. The coating composition of claim 2 wherein the inorganic oxide particles comprise silica.

13. The coating composition of claim 12 wherein the silicone acrylate is present at from 0.5 to 5% by weight of the total coating composition.

14. The coating composition of claim 12 wherein the anionic initiator is an anionic photoinitiator and the coating composition contains less than 0.5% by total weight of dye-tint enhancers selected from the group consisting of glycidyl ethers, allyl ethers and vinyl ethers.

15. The coating composition of claim 2 wherein the silicone acrylate is present at from 0.5 to 5% by weight of the total coating composition and the coating composition contains less than 0.5% by total weight of dye-tint enhancers selected from the group consisting of glycidyl ethers, allyl ethers and vinyl ethers.

16. The coating composition of claim 15 wherein the anionic initiator is an anionic photoinitiator.

17. A method for providing an abrasion-resistant organic dye-tintable coating to a polymeric surface comprising applying the coating composition of claim 2 to a polymeric surface to form a fluid coating and irradiating the fluid coating to cause activation of the photoinitiator and curing of the fluid coating into an abrasion-resistant organic dye-tintable coating.

18. The coating composition of claim 1 wherein the hydrolyzed epoxysilane is derived from γ-glycidoxy-propyl-trimethoxysilane.

19. The coating composition of claim 1 wherein the inorganic oxide particles comprise silica and the coating composition contains less than 0.5% by total weight of dye-tint enhancers selected from the group consisting of glycidyl ethers, allyl ethers and vinyl ethers.

20. The coating composition of claim 19 wherein the anionic initiator is an anionic photoinitiator.

21. The coating composition of claim 1 wherein the silicone acrylate is present at from 0.5 to 5% by weight of the total coating composition.

22. The coating composition of claim 1 wherein the anionic initiator is an anionic photoinitiator.

23. A method for providing an abrasion-resistant organic dye-tintable coating to a polymeric surface comprising applying the coating composition of claim 1 to a polymeric surface to form a fluid coating and irradiating the fluid coating to cause activation of the photoinitiator and curing of the fluid coating into an abrasion-resistant organic dye-tintable coating.

* * * * *